US012603706B1

(12) United States Patent
Zhang et al.

(10) Patent No.: US 12,603,706 B1
(45) Date of Patent: Apr. 14, 2026

(54) DISPERSION MANAGEMENT METHOD AND SYSTEM FOR OPTICAL TRANSCEIVERS

(71) Applicant: Linktel Technologies, Inc., Milpitas, CA (US)

(72) Inventors: Li Zhang, Wuhan (CN); Ming Xiao, Wuhan (CN); Linke Li, Wuhan (CN); Tianshu Wu, Wuhan (CN); Xianwen Yang, Wuhan (CN); Jian Zhang, Wuhan (CN); Chi Jim Wu, Milpitas, CA (US)

(73) Assignee: Linktel Technologies, Inc., Milpitas, CA (US)

( * ) Notice: Subject to any disclaimer, the term of this patent is extended or adjusted under 35 U.S.C. 154(b) by 0 days.

(21) Appl. No.: 19/295,081

(22) Filed: Aug. 8, 2025

(51) Int. Cl.
*H04B 10/2513* (2013.01)
*H04B 10/40* (2013.01)

(52) U.S. Cl.
CPC ......... *H04B 10/2513* (2013.01); *H04B 10/40* (2013.01)

(58) Field of Classification Search
None
See application file for complete search history.

(56) References Cited

U.S. PATENT DOCUMENTS

| | | | | |
|---|---|---|---|---|
| 6,473,210 | B1 * | 10/2002 | Evjenth ............ | H04B 10/07955 398/38 |
| 7,050,671 | B1 | 5/2006 | Zhang et al. | |

| | | | | |
|---|---|---|---|---|
| 11,550,170 | B2 | 1/2023 | Zhang et al. | |
| 2002/0048062 | A1 | 4/2002 | Sakamoto et al. | |
| 2002/0081062 | A1 | 6/2002 | He | |
| 2003/0035629 | A1 * | 2/2003 | Painchaud ........... | G02B 6/2932 385/27 |
| 2004/0213578 | A1 * | 10/2004 | Takahara ........... | H04B 10/2513 398/147 |
| 2005/0013537 | A1 | 1/2005 | Yamazaki | |
| 2005/0286578 | A1 | 12/2005 | Uchida et al. | |
| 2008/0240646 | A1 * | 10/2008 | Yamazaki ......... | G02B 6/12007 385/14 |
| 2009/0067783 | A1 | 3/2009 | Webb et al. | |
| 2009/0238563 | A1 | 9/2009 | Fukashiro et al. | |

(Continued)

OTHER PUBLICATIONS

U.S. Appl. 19/026,490, filed Jan. 2025, Zhang et al.

(Continued)

*Primary Examiner* — Darren E Wolf
(74) *Attorney, Agent, or Firm* — Dority & Manning, PA

(57) ABSTRACT

In one embodiment, a method for dispersion compensation by an optical transceiver includes: receiving an output from a digital signal processor of the optical transceiver; determining a difference between the received output and an initial target output; based on determining that the difference between the received output and the initial target output exceeds a threshold, tuning a temperature of a dispersion management device of the optical transceiver across a first temperature range; identifying an adjusted target output based on the temperature tuning across the first temperature range; and adjusting the temperature of the dispersion management device to an adjusted target temperature corresponding to the adjusted target output.

18 Claims, 11 Drawing Sheets

(56)         References Cited

U.S. PATENT DOCUMENTS

| | | | |
|---|---|---|---|
| 2009/0238578 A1* | 9/2009 | Taylor | H04B 10/6972 398/147 |
| 2009/0269074 A1* | 10/2009 | Tidhar | H04B 10/1143 398/130 |
| 2010/0221021 A1* | 9/2010 | Onaka | H04B 10/671 398/208 |
| 2011/0026927 A1 | 2/2011 | Tanaka et al. | |
| 2011/0229153 A1 | 9/2011 | Sekine | |
| 2011/0318021 A1* | 12/2011 | Zhou | H04L 27/0014 375/376 |
| 2014/0029951 A1 | 1/2014 | Handelman | |
| 2014/0369689 A1* | 12/2014 | Gadkari | H04B 10/2589 398/67 |
| 2018/0337512 A1 | 11/2018 | Tian et al. | |
| 2023/0081925 A1* | 3/2023 | Chen | H04J 14/08 398/16 |
| 2023/0239045 A1* | 7/2023 | Calhoun | H04B 10/40 398/29 |

OTHER PUBLICATIONS

Zhou et al, "State-of-the-Art 800G/1.6T Datacom Interconnects and Outlook for 3.2T", Optica Publishing Group, 2023, 3 pages.
Liu et al, "Inter-Channel FWM Mitigation Techniques for 800G-LR4, 1.6T-LR8, 400G-ER4 and 5G Fronthaul Applications Based on O-Band WDM", Journal of Lightwave Technology, vol. 42, No. 3, Feb. 1, 2024, 10 pages.
Ran et al, "Dispersion-Compensation-Enabled Silicon Mach-Zehnder Modulator for CWDM6 Applications", European Conference on Optical Communication, 2024, Frankfurt, Germany, 4 pages.
Office Action received in corresponding U.S. Appl. No. 19/295,055, dated Oct. 7, 2025, 23 pages.

* cited by examiner

310

1000

Increasing a temperature of a DMD by more than one free spectral range — 1010

During the temperature increase of the DMD, receiving multiple outputs from a DSP and corresponding temperatures of the DMD — 1020

Identifying a target output from the received outputs and a corresponding target temperature — 1030

Adjusting the temperature of the DMD to the target temperature — 1040

1100

1400

DISPERSION MANAGEMENT METHOD AND SYSTEM FOR OPTICAL TRANSCEIVERS

TECHNICAL FIELD

This disclosure generally relates to fiber optics and optical communication, and in particular relates to dispersion management in optical transceivers for data centers and communication networks.

BACKGROUND

Optical transceivers are commonly used for transmitting and receiving optical signals in high-capacity data centers and communication systems. As bandwidth demands for telecommunication services continue to grow, the need to upgrade and enhance the performance of optical transceivers increases accordingly. Dispersion—i.e., the broadening of light pulses—is one of the factors that limits the quality of signal transmission over optical links. In some instances, dispersion may arise from the physical properties of the transmission medium. For example, fibers used in high-speed optical networks may be subject to chromatic dispersion, which causes signal spreading over time due to the different propagation speeds of light rays, thus degrading the quality and reliability of data transmission.

With optical networks evolving from 100 G to 800 G, 1.6 T, and beyond, the acceptable tolerance for dispersion is drastically reduced. These tight tolerances in high-speed networks lead to increased pressure on optical communication technologies to effectively manage dispersion.

SUMMARY OF PARTICULAR EMBODIMENTS

In particular embodiments, an optical transceiver includes a digital signal processor, a transmitter coupled to the digital signal processor, and a receiver coupled to the digital signal processor. The receiver is configured to receive an optical signal. The receiver includes a demultiplexer for optical demultiplexing of the optical signal into a plurality of channels and a plurality of dispersion management devices. Each of the dispersion management devices is associated with a respective channel of the plurality of channels of the demultiplexer and configured for dispersion compensation at the respective channel. Each of the dispersion management devices includes a thermal control component configured to thermally adjust the dispersion compensation by the dispersion management device based on an output of the digital signal processor.

In particular embodiments, an optical transceiver includes a digital signal processor, a transmitter coupled to the digital signal processor, and a receiver coupled to the digital signal processor. The receiver is configured to receive an optical signal. The receiver includes a plurality of demultiplexers and a plurality of dispersion management devices for each of the plurality of demultiplexers. Each of the plurality of demultiplexers is configured for optical demultiplexing of the optical signal into a plurality of channels. Each of the dispersion management devices is associated with at least an edge channel of the plurality of channels of the respective demultiplexer and configured for dispersion compensation at least at the respective edge channel. Each of the dispersion management devices includes a thermal control component configured to thermally adjust the dispersion compensation by the dispersion management device based on an output of the digital signal processor.

In particular embodiments, a receiver for an optical transceiver is provided. The receiver is configured to receive an optical signal. The receiver includes a demultiplexer for optical demultiplexing of the optical signal into a plurality of channels and a plurality of dispersion management devices. Each of the dispersion management devices is associated with a respective channel of the plurality of channels of the demultiplexer and configured for dispersion compensation at the respective channel. Each of the dispersion management devices includes a thermal control component configured to thermally adjust the dispersion compensation by the dispersion management device based on an output of a digital signal processor of the optical transceiver.

In particular embodiments, a method for dispersion compensation by an optical transceiver includes: receiving an output from a digital signal processor of the optical transceiver; determining a difference between the received output and an initial target output; based on determining that the difference between the received output and the initial target output exceeds a threshold, tuning a temperature of a dispersion management device of the optical transceiver across a first temperature range; identifying an adjusted target output based on the temperature tuning across the first temperature range; and adjusting the temperature of the dispersion management device to an adjusted target temperature corresponding to the adjusted target output.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to an apparatus, a system, a method, a storage medium, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
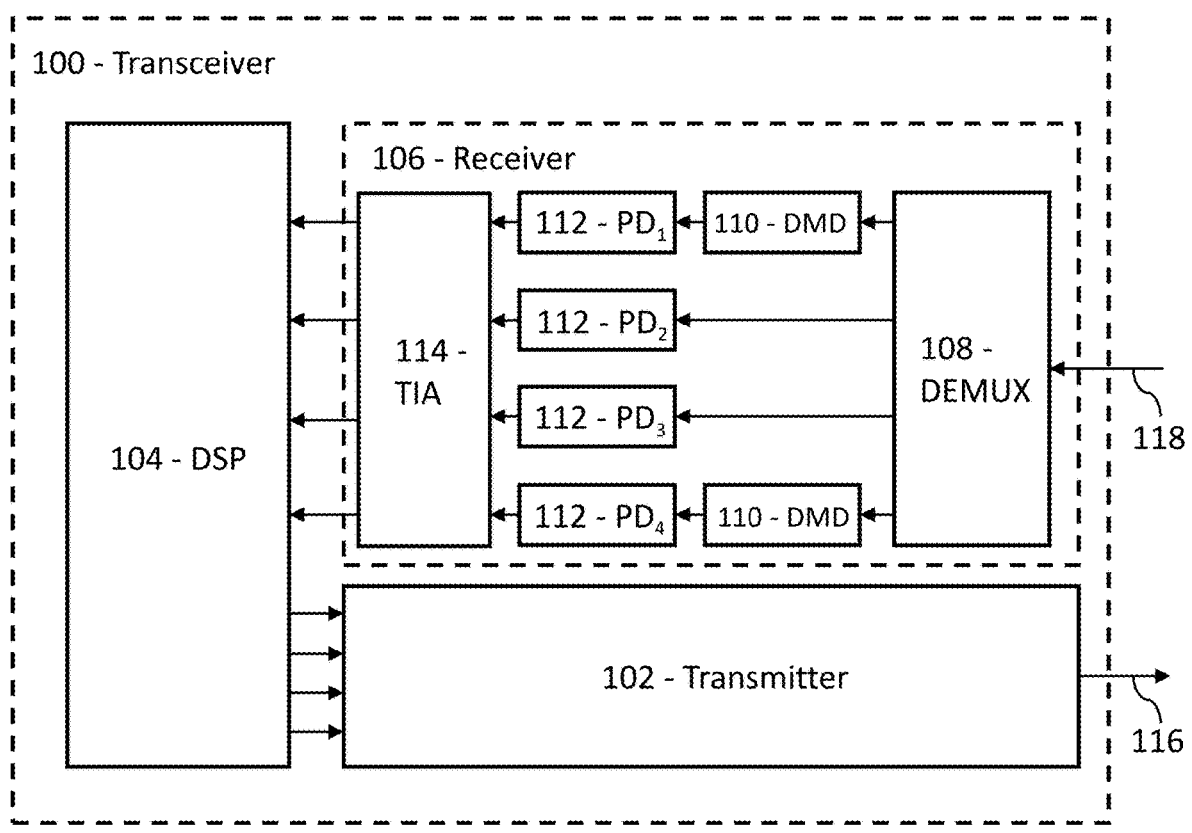
FIG. 1 illustrates an example optical transceiver.

Optical transceivers in data centers or other communication and networking facilities typically utilize light as a carrier for transmitting high-speed signals. However, when optical waves propagate through optical fibers, they may be subject to dispersion-specifically, chromatic dispersion, where different wavelengths (or frequencies) of light travel at different speeds. This phenomenon may lead to pulse broadening of the optical signals, which may degrade signal integrity. Specifically, for example, the extent of signal broadening may be characterized by a time delay $\Delta t_{chrom}$ that is determined by the product of the chromatic dispersion coefficient of the fiber $D(\lambda)$, the fiber length L, and the spectral width of the signal $\Delta\lambda$, as indicated by the following equation:

$$\Delta t_{chrom} = D(\lambda)L\Delta\lambda \qquad (1)$$

As an example and not by way of limitation, in a 100 G per lane system employing a 56 GBaud PAM4 (Pulse Amplitude Modulation with four levels) format, chromatic dispersion may become particularly pronounced at longer transmission distances. Taking an edge wavelength (e.g., 1334 nm) of a Coarse Wavelength Division Multiplexing (CWDM) system as an example, propagation through 10 km of optical fiber may introduce a time delay of 12 ps. This delay exceeds half the signal period (which may be 20 ps), causing undesired performance degradation.

As the rate of data transmission scales up, the challenges of chromatic dispersion may become increasingly more severe. For instance, when the signal rate doubles to 200 G per lane, the spectral width may correspondingly double. Consequently, the time delay induced by 10 km of fiber becomes twice that of 100 G-per-lane systems. Moreover, the signal period is halved to 10 ps. The net effect thus reduces the maximum transmission distance to one quarter of the 100 G-per-lane baseline. Analogously, for example, if the threshold transmission distance for a 100 G-per-lane system is about 10 km, then for a 200 G-per-lane system, it may be reduced to around 2.5 km; and for a 400 G-per-lane system, it may be further constrained to just about 600 m.

Table 1 below provides a brief summary of different optical parameters associated with the 100 G-per-lane and 200 G-per-lane applications, respectively, at a wavelength of 1334 nm, as previously discussed.

TABLE 1

| 1334 nm | $D(\lambda)$ (ps/(nm*km)) | L (km) | $\Delta\lambda$ (nm) | $\Delta t_{chrom}$ (ps) | Signal Period (ps) |
|---|---|---|---|---|---|
| 100G/lane | 2 | 10 | 0.6 | 12 | 20 |
| 200G/lane | 2 | 10 | 1.2 | 24 | 10 |

To address the issue of chromatic dispersion in optical transmission systems, three approaches are commonly utilized: Local Area Network Wavelength Division Multiplexing (LAN-WDM, or LWDM for short), chirp control, and coherent technique. Compared to CWDM, LWDM may operate in a narrower spectral band centered around the fiber's zero-dispersion wavelength (such as ~1310 nm). This reduces the dispersion coefficient $D(\lambda)$ of the fiber at the operating wavelength, thereby mitigating chromatic dispersion. However, LWDM involves tighter wavelength spacing, making fabrication more complex and costly. In addition, LWDM systems may not be operable with existing CWDM architectures and may be more susceptible to nonlinear effects such as four-wave mixing (FWM). Furthermore, notably, because LWDM essentially avoids rather than compensates for dispersion, as the data transmission rate continues to increase (e.g., to 400 G per lane), the dispersion tolerance decreases, making LWDM increasingly inadequate.

Another approach is chirp control on the transmission side, which may involve manipulating the optical chirp of a light source or modulator of the transmitter in order to counteract fiber-induced dispersion. For instance, by introducing an asymmetric splitting ratio in a Mach-Zehnder modulator, a desired chirp may be induced to offset the fiber time delay. However, such a configuration may degrade the performance of the modulator itself, making this approach less desirable in commercial applications.

Lastly, coherent technology, particularly coherent-lite (a simplified version of full coherent systems), may offer another option by employing high-order phase modulation to increase spectral efficiency. This technique eliminates the need for CWDM or LWDM, essentially bypassing chromatic dispersion. In practice, for example, coherent-lite systems at 800 G may achieve transmission distances up to 40 km. However, these systems introduce higher complexity, greater power consumption, and are not compatible with existing frameworks like CWDM or LWDM, making integration into legacy systems difficult and expensive.

To address one or more of the challenges, particular embodiments disclosed herein introduce dispersion management in optical transceivers by incorporating dispersion management devices into the optical paths of the transceivers. Particular embodiments may provide dynamic and adaptive dispersion management for the optical transceivers by thermally tuning the dispersion management devices in order to achieve a desired dispersion compensation, thereby effectively addressing fiber chromatic dispersion issues. By incorporating the dispersion management devices within the established system architecture, particular embodiments may present an efficient and cost-effective solution without requiring significant transceiver redesign and retrofitting.

FIG. 1 illustrates an optical transceiver 100 according to particular embodiments of the disclosure. The optical transceiver 100 may be configured to transmit and receive signal data by converting electrical signals to optical signals (and vice versa) for fiber-optic communication. In particular embodiments, the optical transceiver 100 may be configured to support CWDM technology, such as CWDM4, which may operate with four separate wavelengths. In such scenarios, as an example and not by way of limitation, the optical transceiver 100 may be configured to transmit and receive data by splitting the signal into four optical channels, each using a distinct wavelength (i.e., 1271 nm, 1291 nm, 1311 nm, and 1331 nm, respectively). Although this disclosure describes an optical transceiver suitable for use in a particular CWDM configuration in a particular manner, this disclosure contemplates optical transceivers suitable for use in any suitable CWDM configurations in any suitable manner. In particular embodiments, the optical transceiver 100 may be suitable for custom wavelength division multiplexing, which, for example, may have a channel spacing of approximately 10 nm—between that of CWDM (~20 nm) and LWDM (~4 nm). In particular embodiments, the optical transceiver 100 may be applicable to LWDM-based systems, such as for single-wavelength 400 G transmission over 10 km distances. In particular embodiments, the optical transceiver 100 may be configured for use in any suitable optical communication system operating within the O-band (1260-1360 nm) and subject to chromatic dispersion constraints. As used herein, the O-band may represent the wavelength range commonly used by optical transceivers in data centers.

In particular embodiments, the optical transceiver 100 may generally include a transmitter 102, a digital signal processor (DSP) 104, and a receiver 106. In particular embodiments, the transmitter 102 may be coupled to the transmission side of the digital signal processor 104 and configured to receive processed electrical signals from the digital signal processor 104 and convert them into a first optical signal 116 for transmission. The transmitter 102 may include one or more of a laser diode, a photodetector, a driver, an optical interface, an electrical interface, or other suitable transmitter components, details of which will not be described exhaustively herein to avoid obscuring the scope of the disclosure. As an example and not by way of limitation, the transmitter 102 may be implemented as a module such as, for example, a transmitter optical sub-assembly (TOSA).

In particular embodiments, the digital signal processor 104 may be in communication with the transmitter 102 and receiver 106. In particular embodiments, the digital signal processor 104 may operate on electrical signals and may be configured for data collection, monitoring, processing, and conditioning for both the transmission and reception paths. As an example and not by way of limitation, the digital signal processor may include one or more of computing components, such as the ones described with reference to FIG. 14, or other suitable processor components.

In particular embodiments, the receiver 106 may be configured to receive a second optical signal 118 and convert it into one or more electrical signals for further processing by the digital signal processor 104. In particular embodiments, the receiver 106 may generally include a demultiplexer (DEMUX) 108, an array of photodetectors (PD$_n$) 112, and a transimpedance amplifier (TIA) 114. In particular embodiments, the demultiplexer 108 may be configured to separate the incoming second optical signal 118 by wavelength and direct the separated signals to an appropriate photodetector. As an example and not by way of limitation, in the context of CWDM4, the demultiplexer 108 may demultiplex or separate the second optical signal 118 into four respective downstream channel wavelengths—i.e., 1271 nm, 1291 nm, 1311 nm, and 1331 nm, respectively. Correspondingly, four photodetectors (namely, PD$_1$, PD$_2$, PD$_3$, and PD$_4$), such as photodiodes, may be configured to detect the optical signals at the respective separated channel wavelengths and generate corresponding electrical signals.

The transimpedance amplifier 120 may be configured to convert the photocurrents produced by the photodetectors into respective voltage signals. In particular embodiments, the receiver 106 may be implemented as a module such as, for example, a receiver optical sub-assembly (ROSA).

In order to provide for dispersion management on the reception side of the transceiver 100, in particular embodiments, the receiver 106 may further include multiple dispersion management devices (DMDs) 110, which may be in optical communication with the demultiplexer 108. The dispersion management devices 110 may be positioned immediately downstream of the demultiplexer 108 in the direction of signal transmission, as shown—for example, between the demultiplexer 108 and respective photodetectors 112, such as PD$_1$ and PD$_4$. In particular embodiments, each of the dispersion management devices 110 may be associated with a respective channel of the demultiplexer 108 and may be configured to perform dispersion compensation for that channel. As an example and not by way of limitation, in the illustrated embodiment, two dispersion management devices 110 may be provided, each configured to receive an optical signal from an edge channel of demultiplexer 108. Specifically, as illustrated, an upper dispersion management device 110 may receive an optical signal at a wavelength of 1271 nm, while a lower dispersion management device 110 may receive an optical signal at 1331 nm. In this embodiment, the middle two channels, having wavelengths of 1291 nm and 1311 nm, respectively, may not undergo dispersion compensation. Configured this way, since the edge channels typically experience greater fiber dispersion due to their locations at the spectral extremes of the CWDM band, selectively configuring dispersion management to only the edge channels may sufficiently compensate chromatic dispersion while minimizing design complexity and cost. This may be useful in applications including 400 G FR4-20 km (Forward Reach, 4 lanes/wavelengths with maximum transmission distance of 20 km) and 800 G FR4-10 km (Forward Reach, 4 lanes/wavelengths with maximum transmission distance of 10 km).

Alternatively or additionally, although not shown in FIG. 1, in particular embodiments, each output channel of the demultiplexer 108 may be provided with a corresponding dispersion management device 110. In this regard, for example, in the CWDM4 use case, the receiver 106 may include four dispersion management devices 110 in total, each associated with one of the four channel wavelengths: 1271 nm, 1291 nm, 1311 nm, and 1331 nm, respectively, thereby enabling per-channel dispersion compensation, allowing the receiver 106 to mitigate wavelength-dependent dispersion across the entire band.

In particular embodiments, each of the dispersion management devices 110 may include a thermal control component. The thermal control component may be configured to adjust the temperature of the dispersion management device 110 based on an output of the digital signal processor, in order to thermally adjust the dispersion compensation by the dispersion management device. As an example and not by way of limitation, each of the dispersion management devices 100 may also include an optical component for performing dispersion compensation, such as an etalon or a ring resonator. The optical component may be temperature sensitive. The thermal control component may be configured to adjust the temperature of the optical component in response to control commands, thereby achieving the desired dispersion compensation, as will be discussed in greater detail in the following.

Figure 2:
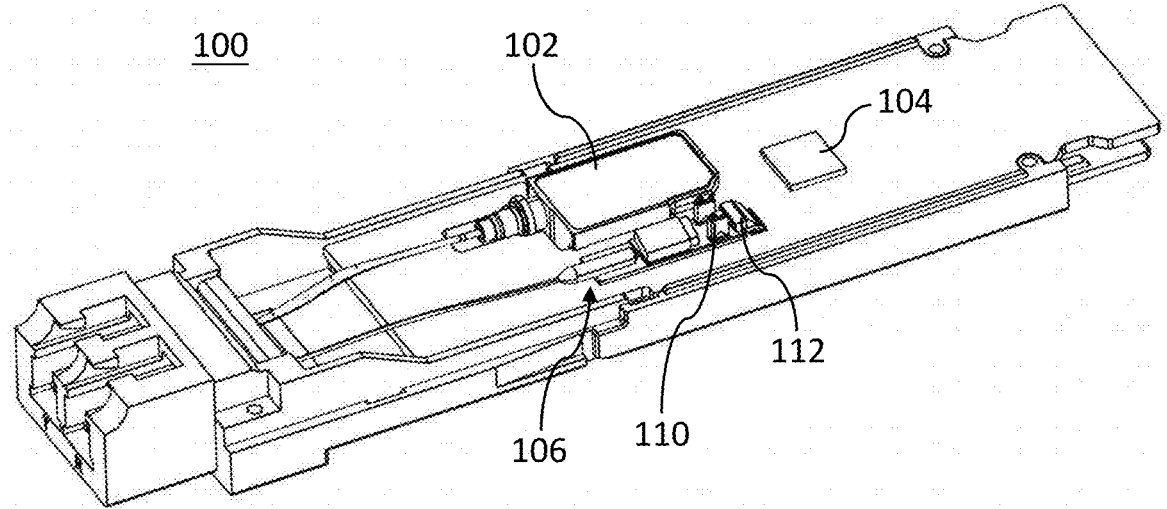
FIG. 2 illustrates a perspective view of the example optical transceiver of FIG. 1.

FIG. 2 illustrates a perspective three-dimensional view of the transceiver 100 of FIG. 1. The dispersion management device 110 may be formed with a compact structure in order to fit into the tight spacing between the demultiplexer 108 and the photodetectors 112. In particular embodiments, the dispersion management device 110 may be assembled into existing receiver architectures without requiring significant retrofitting.

Figure 3:
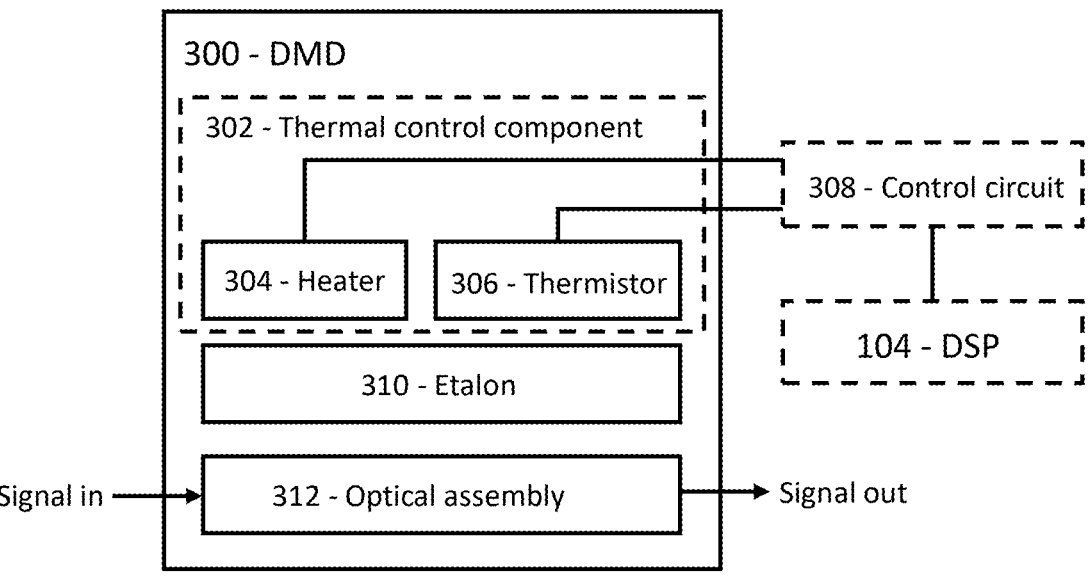
FIG. 3 illustrates an example dispersion management device.

FIG. 3 illustrates an example dispersion management device 300 coupled to the digital signal processor 104. The dispersion management device 300 may include similar components described with reference to other figures and may be compatible with various embodiments disclosed herein. In particular embodiments, the dispersion management device 300 may include a thermal control component 302. The thermal control component 302 may be configured to thermally adjust the dispersion compensation by the dispersion management device 300 by tuning its temperature based on an output of the digital signal processor 104. In particular embodiments, the dispersion management device 300 may also include an etalon 310. The etalon 310 may be configured to introduce wavelength-dependent phase shifts for chromatic dispersion compensation. The thermal control component 302 may control the temperature of the etalon 310 in order to correspondingly adapt its dispersion compensation to a desired value. For instance, the temperature of the etalon 310 may be controllably raised such that the dispersion spectrum of the etalon 310 may be shifted relative to the spectrum of the received optical signal by a certain range, thereby offsetting the chromatic dispersion of the signal.

In particular embodiments, the thermal control component 302 may include a heater 304 for heating the etalon 310 and a thermistor 306 for monitoring its actual, real-time temperature and providing control feedback. The heater 304 and/or the thermistor 306 may be integrated with or attached to the etalon 310, such as in direct contact with or otherwise located in proximity to the etalon 310, for optimal heat conductance. Alternatively, in some embodiments, temperature adjustment may be implemented by the heater 304 alone, without the use of a thermistor. As an example and not by way of limitation, accurate temperature control may be achieved solely by controlling the power supplied to the heater 304.

In particular embodiments, the thermal control component 302 may be coupled to a control circuit 308 configured to control the temperature of the thermal control component 302. For example, the heater 304 and/or the thermistor 306 may be electrically connected with the control circuit 308 and operate based on a control signal or command from the control circuit 308. As an example and not by way of limitation, in the illustrated embodiment, the control circuit 308 may be external to the thermal control component 302, the overall dispersion management device 100, or the digital signal processor 104. Alternatively, in some embodiments, the control circuit 308 may be integrated into the thermal control component 302, the dispersion management device 100, or the digital signal processor 104. In particular embodiments, the control circuit 308 may be implemented as a centralized unit configured to manage multiple dispersion management devices 300. Alternatively, in some embodiments, the control circuit 308 may be arranged within each individual dispersion management device 300 (or within each dispersion management device 300) for independent thermal control.

In particular embodiments, the control circuit 308 may receive one or more outputs from the digital signal processor 104, based on which the target temperature of the dispersion management device 300 may be adjusted. As an example and not by way of limitation, the output of the digital signal processor 104 may include a signal-to-noise ratio (SNR) reading, bit error rate (BER), or the like. For instance, the output may be indicative of the quality of the received signal and may reflect the level of signal degradation caused by factors such as chromatic dispersion, for example.

Figure 4:
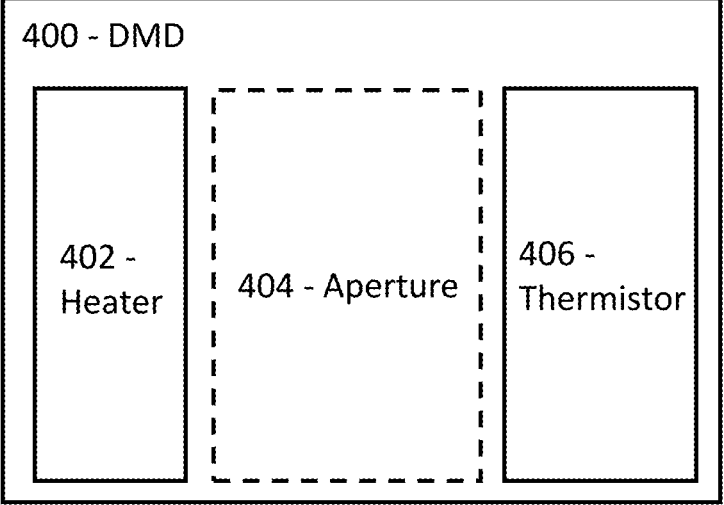
FIG. 4 illustrates another example dispersion management device.

FIG. 4 illustrates another example dispersion management device 400. The dispersion management device 400 may include similar components described with reference to other figures and may be compatible with various embodiments disclosed herein. In particular embodiments, the thermal control component of the dispersion management device 400 may include an integrated heater and thermistor. As an example and not by way of limitation, for CWDM4 applications, due to the high-density configuration of the transceiver, the channel pitch of the receiver optical path may be as narrow as 750 μm, 500 μm, or even less to accommodate the four optical channels. To meet such a constraint, the thermal control component may be chip-based. A thin-film heater 402 and a thin-film thermistor 406 may be respectively positioned near or along a lateral edge of the chip, outside the optical aperture 404 configured for signal transmission. In this way, the overall chip width may be reduced. Alternatively, in particular embodiments, the thin-film heater 402 and the thin-film thermistor 406 may be separately provided and connected together. In particular embodiments, the thin-film heater 402 and the thin-film thermistor 406 may be connected to a control circuit (e.g., the control circuit 308), which together may implement a proportional-integral-derivative (PID) control loop for accurate temperature regulation.

Figure 5:
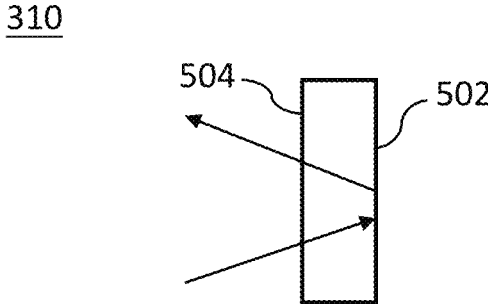
FIG. 5 illustrates an example etalon of the dispersion management device.

FIG. 5 schematically illustrates an example etalon 310 of the dispersion management device. In particular embodiments, the etalon 310 may be implemented as a single-cavity etalon—i.e., a structure having two substantially parallel surfaces that form a single optical cavity. As an example and not by way of limitation, a first side 502 of the etalon 310 may be coated with a high-reflectivity (HR) coating (e.g., R>99.9%), while an opposing second side 504 may be coated with a tunable partial-reflectivity coating (e.g., R adjustable between 0-100%). By adjusting the reflectivity, the interference spectrum of the etalon 310—and hence the dispersion profile—may be modified. This asymmetric coating configuration may enable the etalon 310 to function similarly to a Gires-Tournois etalon, wherein light is almost entirely reflected but with a phase shift, providing dispersion compensation while maintaining minimal optical power loss. In particular embodiments, the etalon 310 may be fabricated from silicon, though other suitable materials may also be used, such as silica or optical glass. In particular embodiments, the etalon 310 may be implemented as a chip-scale structure having a reduced thickness, thereby supporting compact integration within the dispersion management device.

Figure 6:
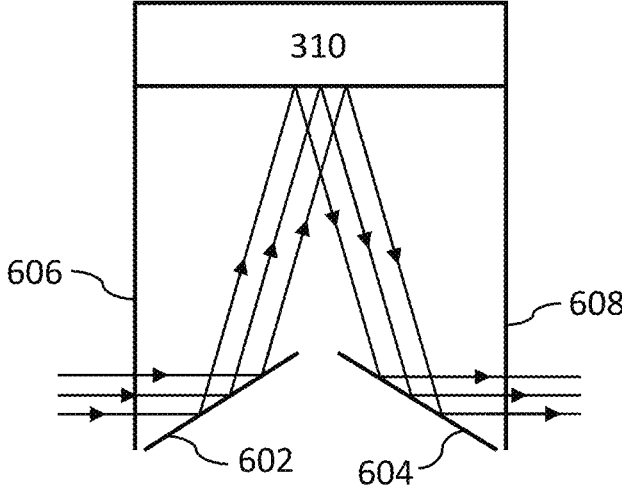
FIG. 6 illustrates an example supporting optical assembly of the dispersion management device.

FIG. 6 schematically illustrates an example supporting optical assembly of the dispersion management device, which may be useful when fitting the dispersion management device into the compact package of the receiver. The optical assembly may be disposed along the optical path downstream of the demultiplexer and configured to guide incoming optical signals from the demultiplexer to the interior of the dispersion management device. In particular embodiments, the optical assembly may include one or more prisms that are attached together. Each prism may include an angle-polished surface, 602 and 604, respectively, configured to enable total internal reflection of the optical signal, directing it onto or away from the etalon 310, as indicated by the arrows in the figure. The input and output surfaces, 606 and 608, on the other hand, may be applied with anti-reflection coating so that light may propagate into and out of the prism assembly with minimal optical loss. In particular embodiments, the optical assembly may be integrated within the dispersion management device as depicted. Alternatively, in particular embodiments, the optical assembly may be separately provided and assembled in place into the receiver if so desired.

Figure 7:
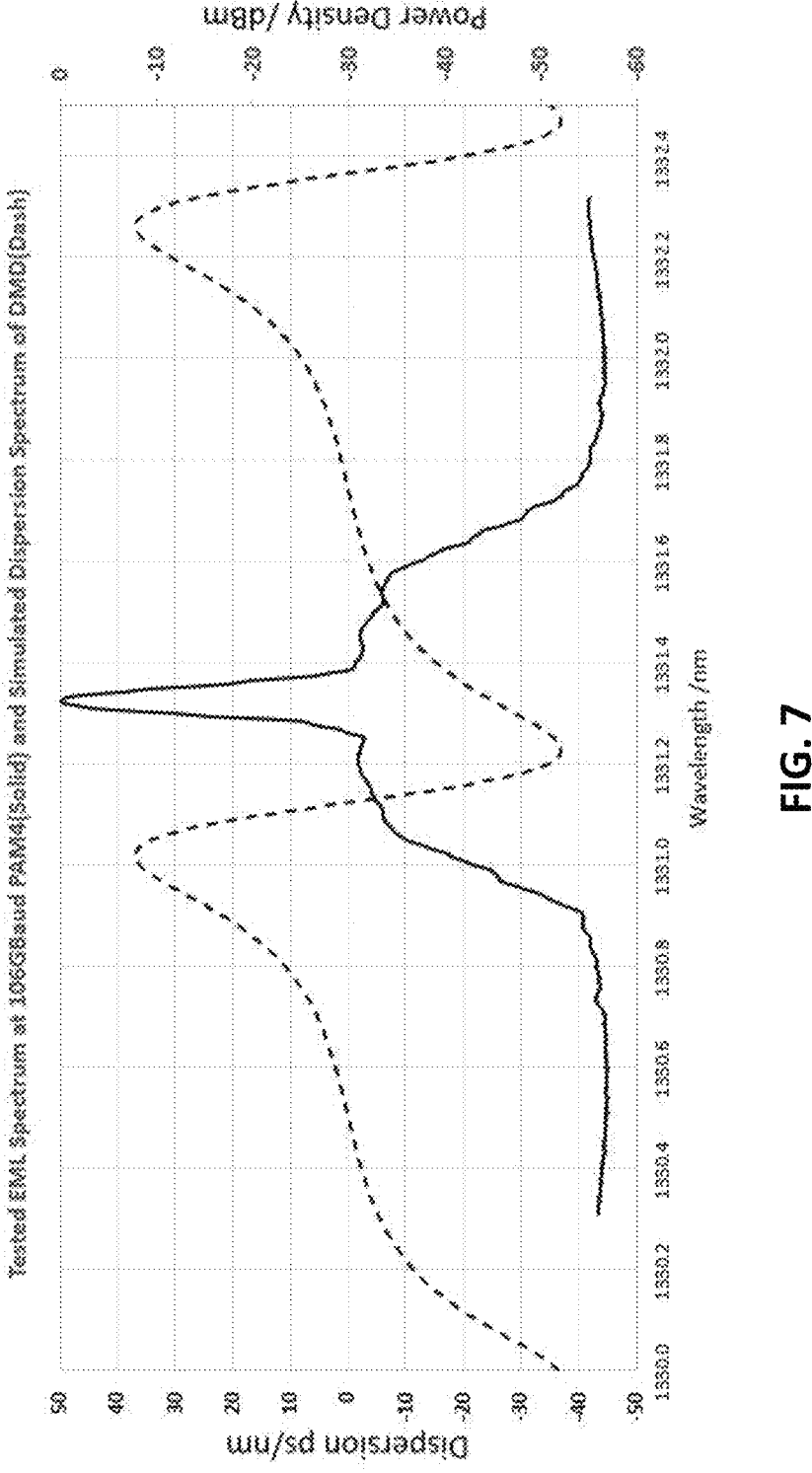
FIG. 7 illustrates a graphical representation of dispersion compensation by the dispersion management device.

FIG. 7 illustrates a graphical representation of dispersion compensation by a dispersion management device. Solely for the purpose of explanation and illustration, and not by way of limitation, the profiles as illustrated in FIG. 7 correspond to an example dispersion management device design suitable for use in a 200 G-per-lane, 10-kilometer optical communication application. Although this disclosure describes dispersion compensation by a dispersion management device in a particular application in a particular manner, this disclosure contemplates dispersion compensation by dispersion management devices in any suitable applications in any suitable manner. In this regard, for example, various embodiments of dispersion compensation disclosed herein may also be applicable to 200 G-per-lane, 20-kilometer optical communication, 400 G-per-lane, 10-kilometer optical communication, 400 G-per-lane, 20-kilometer optical communication, 800 G-per-lane, 10-kilometer optical communication, 800 G-per-lane, 20-kilometer optical communication, 1.6 T-per-lane, 10-kilometer optical communication, 1.6 T-per-lane, 20-kilometer optical communication, just to name a few.

In particular embodiments, as illustrated, the dispersion management device, or more specifically its etalon, may be designed with a dispersion spectrum (as indicated by the dashed line) having a peak dispersion of approximately ±38 ps/nm and a free spectral range (FSR) of about 200 GHz. Due to the inherent thermal sensitivity of the refractive index of the etalon material, the dispersion spectrum of the dispersion management device may be thermally adjustable, allowing the dispersion spectrum to shift (e.g., laterally along the horizontal frequency domain shown) with changes in temperature. As an example and not by way of limitation, a rise in temperature may shift the dispersion spectrum of the dispersion management device to the left toward a lower frequency range, whereas a drop in temperature may shift the dispersion spectrum to the right, where the frequencies are higher. In particular embodiments, for example, the dispersion management device may exhibit a thermal tuning sensitivity of approximately 14 GHz/° C. Accordingly, the effective temperature tuning cycle of the etalon may be approximately 14° C.—in other words, a 14° C. temperature change may result in a spectral shift equal to one full FSR (200 GHz).

In particular embodiments, by thermally adjusting the dispersion management device, the dispersion spectrum may be shifted (e.g., left or right in FIG. 7) relative to the signal spectrum, as denoted by the solid line. Specifically, merely for purposes of illustration and not by way of limitation, the signal spectrum shown may correspond to an electro-absorption modulated (EML) laser operating at 106 GBaud using a PAM4 modulation format. In particular embodiments, this relative shift may alter the phase-based dispersion compensation applied to the optical signal. As an example and not by way of limitation, in the configuration shown, the optical signal spectrum, which remains fixed, may predominantly overlap with the negative dispersion region of the dispersion spectrum of the dispersion management device, thereby introducing negative dispersion compensation to counteract the positive dispersion of the optical fiber. Conversely, by increasing or decreasing the temperature of the dispersion management device, the dispersion spectrum may be shifted such that the positive dispersion region may substantially align with the signal spectrum, thereby providing positive dispersion compensation as desired.

In particular embodiments, the dispersion management device may be thermally tuned to provide a target dispersion compensation for each of the two edge channels within a CWDM4 system. As an example and not by way of limitation, a first dispersion management device may be thermally adjusted to deliver a negative dispersion at the 1330 nm channel so as to offset approximately +25 ps/nm of chromatic dispersion introduced by a 10 km fiber domain. And on the other hand, the temperature of a second dispersion management device may be tuned to provide a positive dispersion at the 1270 nm channel to compensate for −40 ps/nm of fiber-induced dispersion. Additionally or alternatively, in particular embodiments, the relatively flat region on the dispersion spectrum—located between the peak positive and peak negative—may be used to support short-range applications, such as those spanning 0 to 2 km, where minimal dispersion compensation is needed. In particular embodiments, four dispersion management devices may be arranged and thermally tuned to provide a target dispersion compensation for each of the four channels within the CWDM4 system.

Figure 8:
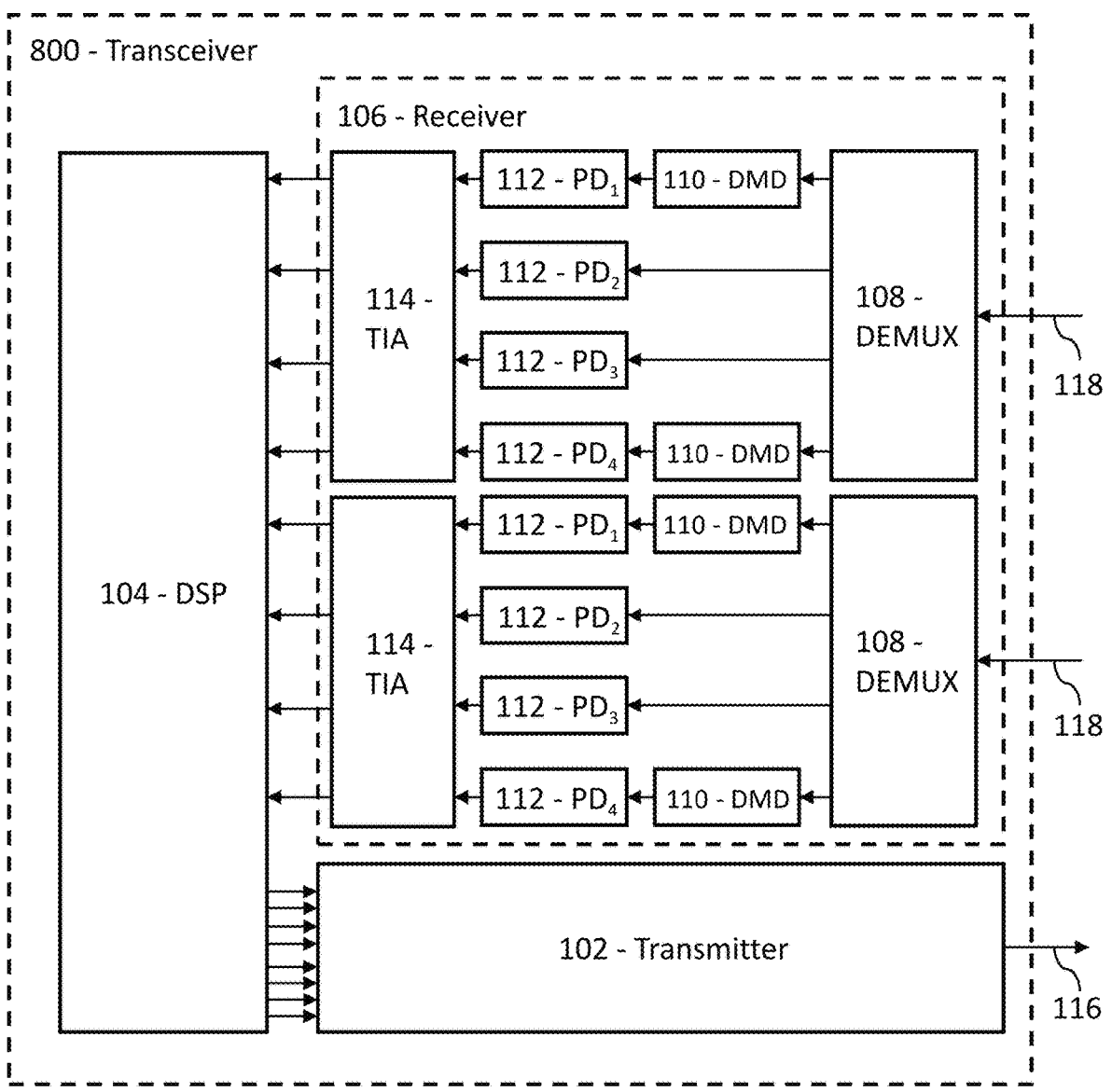
FIG. 8 illustrates another example optical transceiver.

FIG. 8 illustrates another example configuration of an optical transceiver 800. The transceiver 800 may include similar components and functionalities described above with reference to FIGS. 1-7, and may be compatible with various embodiments disclosed herein. In the illustrated embodiment, the receiver 106 of the transceiver 800 may be configured with two sets of modules, each receiving a respective optical signal 118 for demultiplexing, dispersion compensation, signal conversion, etc., and transmitting the processed signals to the downstream digital signal processor 104. Specifically, as an example and not by way of limitation, the receiver 106 may include two demultiplexers 108, each configured to separate incoming optical signal 118 into different channels. At least two dispersion management device 110 may be coupled to each demultiplexer 108 to perform dispersion compensation at the respective edge channels. Configured in this manner, the transceiver 800 may be helpful in applications requiring high data transmission rate such as 800 G 2*FR4-20 km and 1.6 T 2*FR4-10 km applications.

Figure 9:
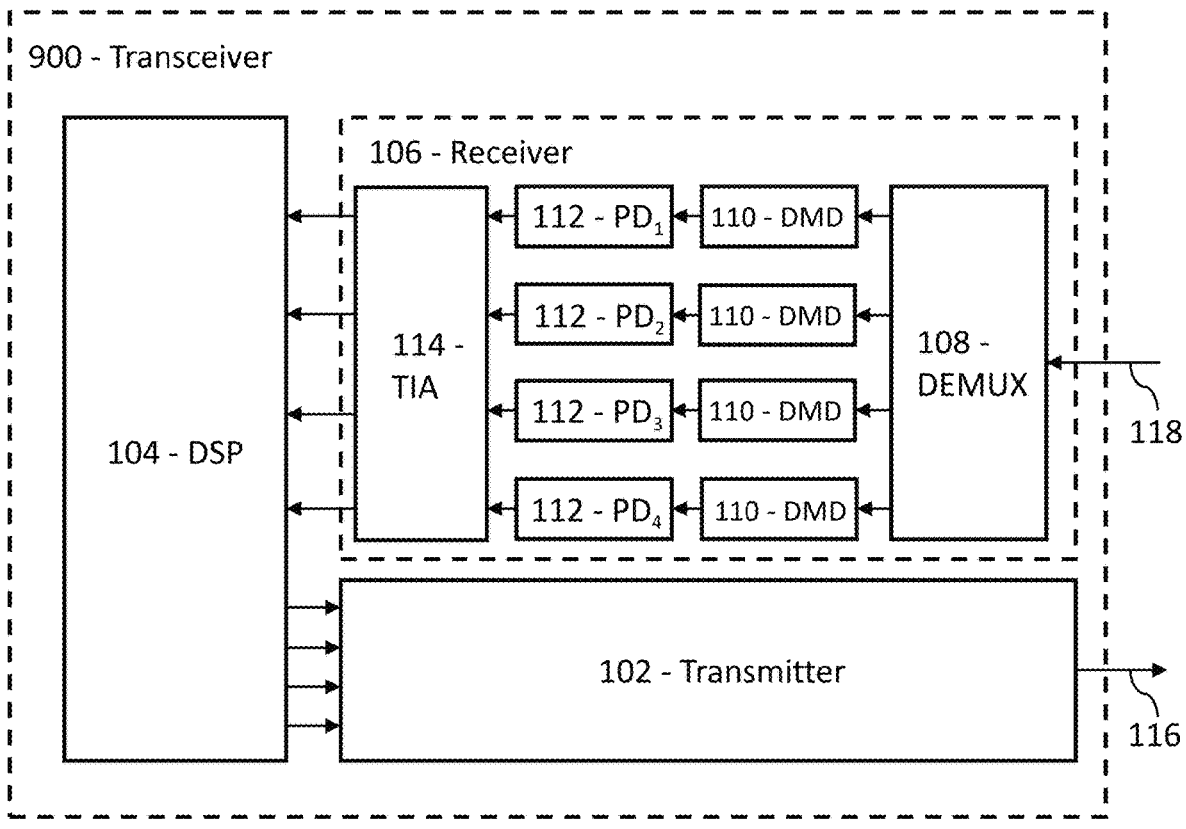
FIG. 9 illustrates a further example optical transceiver.

FIG. 9 illustrates a further example configuration of an optical transceiver 900. The transceiver 900 may include similar components and functionalities described above with reference to FIGS. 1-7, and may be compatible with various embodiments disclosed herein. In the illustrated embodiment, each output channel of the demultiplexer 108 may be provided with a corresponding dispersion management device 110. In this regard, for example, in the CWDM4 use case, the receiver 106 may include four dispersion management devices 110 in total, each associated with one of the four channel wavelengths: 1271 nm, 1291 nm, 1311 nm, and 1331 nm, respectively. This may be useful in applications such as 800 G FR4-20 km and 1.6 T 2*FR4-20 km. Although this disclosure describes transceivers having a particular number of dispersion management devices, demultiplexers, and other receiver components in a particular manner, this disclosure contemplates transceivers having any suitable number of dispersion management devices, demultiplexers, and other receiver components in any suitable manner. As an example and not by way of limitation, in particular embodiments, although not illustrated, to provide for per-channel dispersion compensation at a greater transmission rate, the transceiver may include two demultiplexers, each associated with four dispersion management devices for four respective wavelengths.

Figure 10:
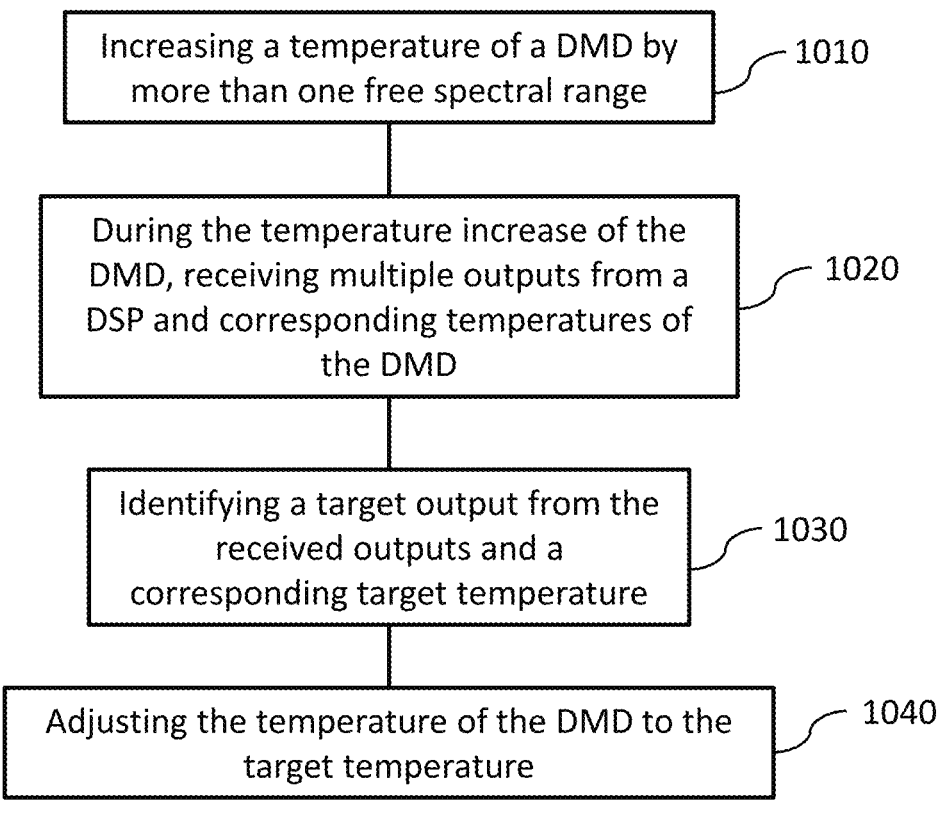
FIG. 10 illustrates an example method for initializing the dispersion management device to perform dispersion compensation.

FIG. 10 illustrates an example method 1000 for initializing the dispersion management device to perform dispersion compensation. The method 1000 may begin at step 1010, where a temperature of the dispersion management device is adjusted (e.g., increased). This may be performed upon startup of the transceiver. As an example and not by way of limitation, during this process, the dispersion management device may first remain in a standby state until the basic transceiver functions are operational, such as power-on, signal detection, and system stabilization. Once these baseline functions are confirmed ready, step 1010 may be initiated. In particular embodiments, the temperature of the dispersion management device may be tuned across a temperature range exceeding one temperature cycle corresponding to the FSR. For instance, in one example embodiment, the temperature of the dispersion management device (or in particular, the etalon) may be raised by at least 14° C., which corresponds to one full FSR shift for the etalon with a tuning sensitivity of approximately 14 GHz/° C. and 200 GHz FSR, as already explained. In particular embodiments, the heater of the dispersion management device may be activated to gradually or rapidly increase the temperature of the etalon so as to perform this thermal sweep.

At step 1020, during the temperature increase of the dispersion management device, multiple outputs may be received from the digital signal processor, and the temperatures of the dispersion management device that correspond to the respective outputs may be recorded. In particular embodiments, this may be done via a control circuit (e.g., control circuit 308 of FIG. 3) or other suitable computing systems associated with the optical transceiver. In particular embodiments, these outputs may be real-time data collected by the digital signal processor that are indicative of signal quality and reflect a degree of dispersion of the signal. Particularly, the outputs may include signal-to-noise ratio (SNR) readings. As an example and not by way of limitation, the transceiver may be configured to continuously or periodically sample these readings in conjunction with the current device temperature. In particular embodiments, to improve sampling efficiency, the SNR and the associated temperature may be continuously obtained in real time throughout the heating cycle. For instance, instead of pausing to stabilize the etalon temperature at each increment, a continuous thermal scan may be performed without interruption. Alternatively, if greater precision is desired, in some embodiments, the temperature may be incrementally raised, with corresponding SNR readings obtained in a stepwise manner.

At step 1030, a target output may be identified from among the received outputs, along with a target temperature corresponding to that target output. In particular embodiments, the target output (e.g., target SNR) may represent the optimal point at which the dispersion management device provides maximum signal quality or best dispersion compensation. The corresponding temperature at which this optimal output was achieved may be designated as the target temperature. As an example and not by way of limitation, a target output may be selected as the highest or lowest value observed during the thermal sweep. As another example and not by way of limitation, a target output may be a value satisfying a predetermined threshold.

Finally, at step 1040, based on the identification, the temperature of the dispersion management device may be adjusted to the target temperature, in order to achieve dispersion compensation corresponding to the target quality output. In particular embodiments, temperature adjustment may be achieved via the thermistor. For instance, the thermistor may be used to monitor temperature and control the current supplied to the heater so as to achieve the desired temperature value. Alternatively, in some embodiments, temperature adjustment may be implemented by the heater alone, without the use of a thermistor. As an example and not by way of limitation, accurate temperature control may be achieved solely by controlling the power supplied to the heater. In particular embodiments, the target temperature determined during the initialization steps above may be maintained as a fixed value throughout operation. Alternatively, in particular embodiments, the target temperature for the dispersion management device may be dynamically adjusted or fine-tuned based on real-time readings of the digital signal processor to ensure that the signal quality remains optimal despite variations in operational conditions, environmental changes, or potential system degradation, which will be explained in greater detail below with reference to FIG. 11.

Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for initializing the dispersion management device to perform dispersion compensation including the particular steps of the method of FIG. 10, this disclosure contemplates any suitable method for initializing the dispersion management device to perform dispersion compensation including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Figure 11:
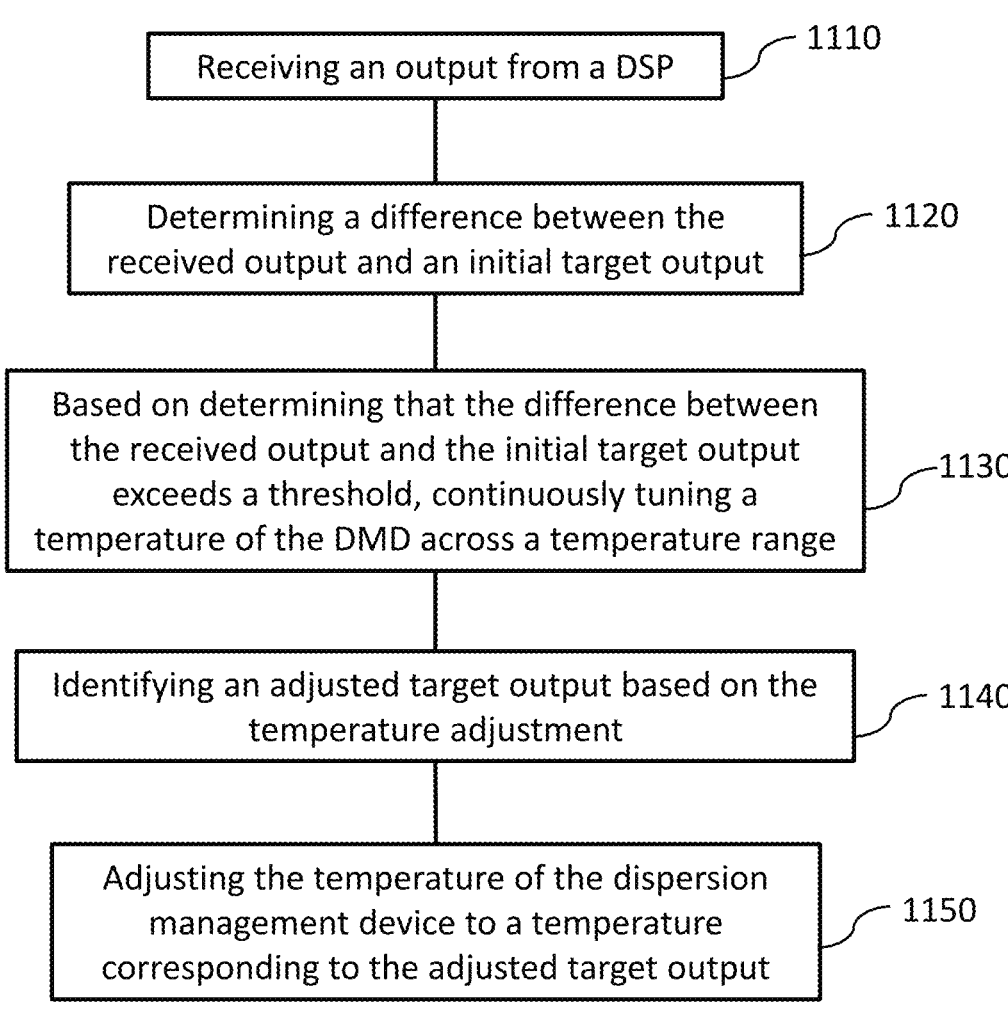
FIG. 11 illustrates an example method for dispersion compensation by the optical transceiver.

FIG. 11 illustrates an example method 1100 for dispersion compensation by an optical transceiver. The method 1100 may begin at step 1110, where an output from a digital signal processor of the optical transceiver may be received. In particular embodiments, this may be done via a control circuit (e.g., control circuit 308 of FIG. 3) or other suitable computing systems associated with the optical transceiver. In particular embodiments, the output from the digital signal processor may be indicative of signal quality on the receiver side. As an example and not by way of limitation, the output may include an SNR reading detected by the digital signal processor, as already discussed.

At step 1120, a difference between the received output (such as the received SNR reading) and an initial target output may be determined. In particular embodiments, the initial target output may be a fixed, predetermined value. As an example and not by way of limitation, the initial target output may be the target output determined during transceiver initialization, as explained above with reference back to FIG. 10, in which the transceiver may perform a thermal sweep at least over one full FSR to find a suitable target output. In particular embodiments, the initial target output may represent the optimal condition in which the dispersion management device is initially set to provide maximum signal quality or best dispersion compensation. Correspondingly, the dispersion management device may already be set to an initial target temperature that is associated with the initial target output.

At step 1130, based on determining that the difference between the obtained output and the initial target output exceeds a threshold, a temperature of the dispersion management device may be adjusted. In particular embodiments, the threshold may be a fixed, predetermined value indicating an acceptable tolerance within which the received output may deviate from the initial target output. For example, if the difference between the obtained output and the initial target output is below the threshold, the dispersion compensation provided by the dispersion management device may be deemed sufficient without requiring thermal adjustment. The method 1100 may then return to step 1110, where the output from the digital signal processor is continued to be monitored and then compared with the initial target output. Conversely, in particular embodiments, when the difference between the obtained output and the initial target output exceeds the threshold, the temperature may be fine-tuned within a temperature range. (In practice, deviation from the initial target output may typically be caused by the wavelength shift of incoming signals or other suitable factors.) In particular embodiments, the temperature range for thermal adjustment in method 1100 may be significantly narrower than the full temperature cycle (e.g., 14° C.) corresponding to one full FSR (e.g., 200 GHz). For instance, the temperature range may include ±1° C., ±2° C., ±3° C., ±4° C., or other suitable values. In other words, rather than performing a full thermal sweep across the FSR as in the initialization phase, a reduced temperature range may be used for fine-scale thermal tuning, allowing the transceiver to dynamically adjust dispersion compensation in real-time during operation.

In particular embodiments, the heater of the dispersion management device may be activated to gradually or rapidly increase the temperature of the etalon across the temperature range so as to perform this fine-scale thermal sweep. In particular embodiments, temperature adjustment may be achieved via the thermistor. For instance, the thermistor may be used to monitor temperature and control the current supplied to the heater so as to achieve the desired temperature value. Alternatively, in some embodiments, temperature adjustment may be implemented by the heater alone, without the use of a thermistor. As an example and not by way of limitation, accurate temperature control may be achieved solely by controlling the power supplied to the heater.

In particular embodiments, during fine-tuning, multiple outputs may be received from the digital signal processor, and the temperatures of the dispersion management device that correspond to the respective outputs may be recorded. As an example and not by way of limitation, the transceiver may be configured to continuously or periodically sample these outputs in conjunction with the current device temperature in a manner similar to the procedures previously described with reference to FIG. 10.

At step 1140, an adjusted target output may be identified based on the temperature adjustment. The adjusted target output may be selected from the multiple outputs received during the fine-scale temperature adjustment. In particular embodiments, the adjusted target output (e.g., an adjusted target SNR) may represent the optimal point at which the dispersion management device provides maximum signal quality or best dispersion compensation. The corresponding temperature at which this optimal output was achieved may be designated as an adjusted target temperature. As an example and not by way of limitation, the adjusted target output may be selected as the highest or lowest value observed during the fine-scale thermal sweep. As another example and not by way of limitation, an adjusted target output may be a value satisfying a predetermined threshold.

At step 1150, the temperature of the dispersion management device may be adjusted to a temperature corresponding to the adjusted target output—i.e., the adjusted target temperature. Once adjusted, the method 1100 may return to step 1110, where the output from the digital signal processor is continued to be monitored and then compared with the initial target output to make sure that the dispersion compensation provided by the dispersion management device always falls within the acceptable range.

Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for dispersion compensation by an optical transceiver including the particular steps of the method of FIG. 11, this disclosure contemplates any suitable method for dispersion compensation by an optical transceiver including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Figure 12:
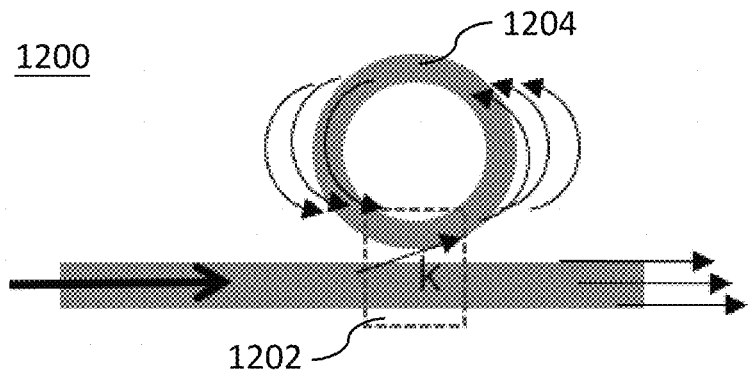
FIG. 12 illustrates an example ring resonator of the dispersion management device.

FIG. 12 illustrates another example configuration of a dispersion management device, which may include a ring resonator 1200. In particular embodiments, the ring resonator 1200 may be configured as an alternative to an etalon (e.g., etalon 310 of FIG. 3). In practice, a free-space optical etalon may be functionally equivalent or similar to a waveguide based ring resonator (or waveguide as used interchangeably herein). Specifically, both the etalon 310 and the ring resonator 1200 may rely on multiple-beam interference for dispersion compensation. For instance, in the etalon, multiple reflections and transmissions within its optical cavity may generate interference. Similarly, in the ring resonator 1200, interference may also be induced by circulating the incoming optical signal within the ring multiple times (as indicated by the arrows). In particular embodiments, by adjusting a coupling coefficient k of a coupler section 1202 of the ring resonator 1200, the interference spectrum (and consequently, the dispersion spectrum) may be accordingly modified (this may be analogous to changing the reflectivity of an etalon.) In particular embodiments, the FSR of the ring resonators 1200 may be determined by the physical circumference of a ring 1204 and a refractive index of the waveguide material.

Figure 13:
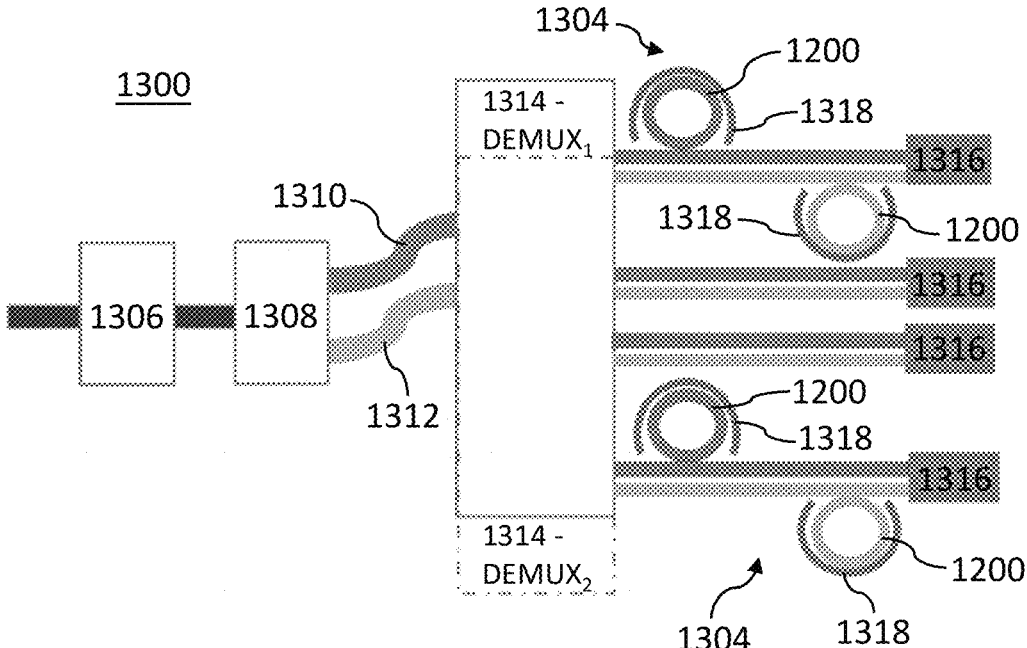
FIG. 13 illustrates an example transceiver having the ring resonator of FIG. 12.

FIG. 13 partially illustrates an example configuration of a receiver 1300 of a transceiver that incorporates multiple ring resonators 1200. The transceiver may include similar components and functionalities described above with other figures, and may be compatible with various embodiments disclosed herein. Specifically, in the illustrated embodiment, the receiver 1300—for example, a four-channel CWDM4 receiver—may include two dispersion management devices 1304 arranged at the two edge channels. The dispersion management devices 1304 each may be integrated with two ring resonators 1200. In particular embodiments, optical signal may first pass through a spot size converter (SSC) 1306, which may be configured to reduce a mode field diameter of the incoming signal to match that of the downstream structures or parts. In particular embodiments, due to the polarization sensitivity of the ring resonators 1200, a polarization splitter and rotator (PSR) 1308 may be employed, which may be coupled to the SSC 1306 to separate the signal (which may initially be unpolarized or randomly polarized) into different transverse electric (TE) and transverse magnetic (TM) components. The PSR 1308 may also be configured to convert the TM-polarized signal into TE mode. As a result, the input optical signal is converted into two signal paths 1310 and 1312, both of which may be in TE polarization.

In particular embodiments, each TE-polarized signal path 1310, 1312 may then enter a respective demultiplexer (DE-MUX$_1$ denoted by solid lines, DEMUX$_2$ by dotted lines) 1314, yielding two sets of separated signals (each set having four wavelength channels). In particular embodiments, the edge channels—i.e., 1271 nm and 1331 nm—of each set may be routed through respective ring resonators 1200 for dispersion management. In particular embodiments, these ring resonators 1200 may be thermally tunable and dynamically controlled based on feedback from the digital signal processor (e.g., digital signal processor 104 of FIG. 1) to achieve optimal dispersion compensation. Subsequently, in particular embodiments, the compensated signals may be directed to respective photodetectors (PD$_1$, PD$_2$, PD$_3$, and PD$_4$) 1316, where the signals are converted into electrical signals for further processing. In particular embodiments, although not shown, each output channel of the demultiplexer 1314 may be provided with a corresponding ring resonator 1200. In this regard, for example, in the CWDM4 use case, four ring resonators 1200 for each demultiplexer 1314, each ring resonator 1200 associated with one of the four channel wavelengths: 1271 nm, 1291 nm, 1311 nm, and 1331 nm, respectively.

In particular embodiments, the passive optical components of the receiver 1300—including the spot size converter 1306, the polarization splitter and rotator 1308, and the demultiplexer 1314—may be implemented using silicon nitride waveguides. For instance, silicon nitride may provide a desired platform for low-loss optical transmission and may exhibit low thermal sensitivity, making it well-suited for stable passive photonic functions. In contrast, since the ring resonators 1200 may require thermal-optic tuning, in particular embodiments, the ring resonators 1200 may be implemented using silicon waveguides (similar to the etalon material described), which provide higher thermal sensitivity. In particular embodiments, the photodetectors 1316 may include germanium-on-silicon (Ge-on-Si) waveguide structures and high-speed metal electrodes to enable efficient signal conversion.

In particular embodiments, to help achieve thermal adjustment of the dispersion management device 1304, a thermal control component 1318 may be integrated with or otherwise attached to a respective ring resonator 1200. As an example and not by way of limitation, the thermal control component 1318 may include a thin-film resistive heater, which may be integrated over or placed adjacent to the ring resonator 1200. Optionally, in particular embodiments, a thermistor (e.g., a thin-film thermistor) may also be integrated for real-time temperature monitoring.

Figure 14:
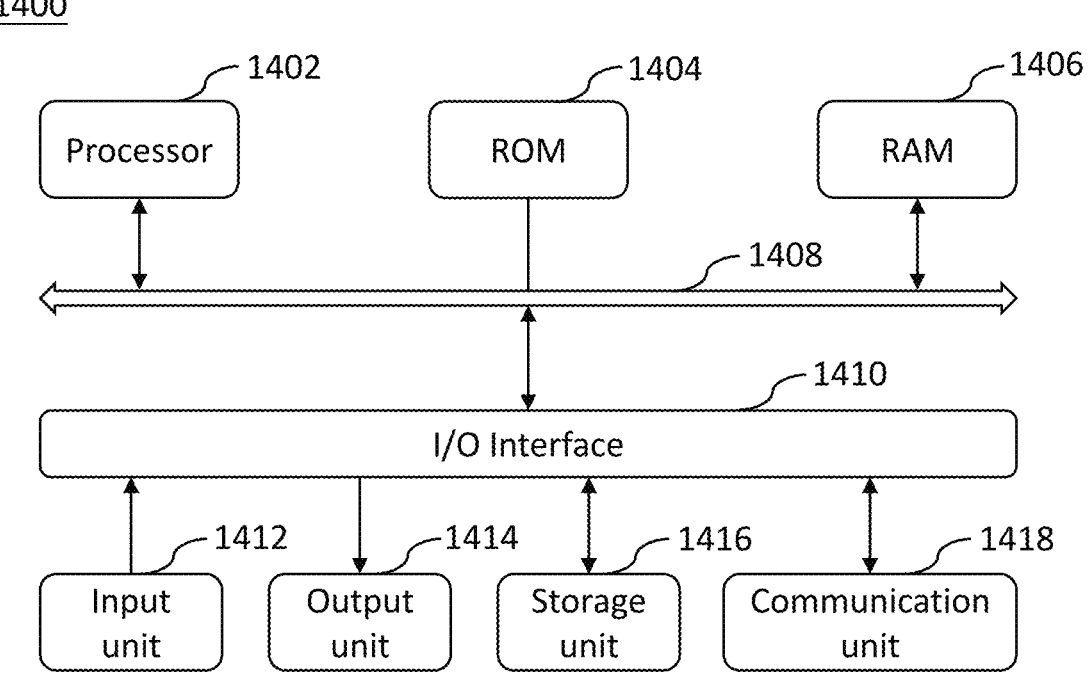
FIG. 14 illustrates an example computer system.

FIG. 14 illustrates a schematic block diagram of a computer system 1400 that may be used to implement embodiments of the present disclosure. The computer system 1400 may be the device or apparatus described in the embodiments of the present disclosure. As shown in FIG. 14, the computer system 1400 includes a processor 1402, which may be configured to execute various appropriate actions and processing to perform the methods (e.g., the methods 1000 and 1100) of the present disclosure. The processor 1402 is implemented in hardware, firmware, or a combination of hardware and software. In addition, although not shown in FIG. 14, the computer system 1400 may also include a co-processor.

The processor 1402 may execute actions and processing to perform the methods of the present disclosure according to computer program instructions. The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded onto a computer, other programmable data processing apparatuses, or other devices, such that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

The computer program instructions may be stored in a Read-Only Memory (ROM) 1404 or be loaded onto a Random Access Memory (RAM) 1406 from a storage unit 1416, for example. The processor 1402, the ROM 1404, and the RAM 1406 are connected to each other via bus 1408. An input/output (I/O) interface 1410 is also connected to bus 1408. The various methods or processes described above may be performed by the processor 1402.

A plurality of components in computer system 1400 are connected to the I/O interface 1410, including: an input unit 1412, such as a keyboard and a mouse; an output unit 1414, such as various types of displays and speakers; the storage unit 1416, such as a magnetic disk and an optical disc; and a communication unit 1418, such as a network card, a modem, and a wireless communication transceiver. The communication unit 1418 allows the computer system 1400 to exchange information/data with other devices via a computer network, such as the Internet, and/or various telecommunication networks.

In some embodiments, the methods and processes described above may be implemented as a computer program product. The computer program product may include a computer-readable non-transitory storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical coding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from those marked in the accompanying drawings. For example, two consecutive blocks may in fact be executed substantially concurrently, and sometimes they may also be executed in a reverse order, depending on the functions involved. It should be further noted that each block in the block diagrams and/or flow charts, as well as a combination of blocks in the block diagrams and/or flow charts, may be implemented using a dedicated hardware-based system that executes specified functions or actions, or using a combination of special hardware and computer instructions.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method for dispersion compensation by an optical transceiver, comprising:

receiving an output from a digital signal processor of the optical transceiver;

determining a difference between the received output and an initial target output;

based on determining that the difference between the received output and the initial target output exceeds a threshold, tuning a temperature of a dispersion management device of the optical transceiver across a temperature range;

receiving a plurality of outputs from the digital signal processor during the temperature tuning across the temperature range;

selecting an adjusted target output from the plurality of received outputs based on the temperature tuning across the temperature range; and adjusting the temperature of the dispersion management device to an adjusted target temperature corresponding to the adjusted target output.

2. The method of claim 1, wherein the temperature range is less than a temperature cycle corresponding to a full free spectral range of the dispersion management device.

3. The method of claim 1, wherein the temperature of the dispersion management device is initially set at an initial target temperature corresponding to the initial target output.

4. The method of claim 1, wherein the optical transceiver is configured for O-band applications.

5. The method of claim 1, wherein the output from the digital signal processor includes a signal-to-noise ratio.

6. The method of claim 1, wherein the temperature of the dispersion management device is continuously tuned during the temperature tuning across the temperature range.

7. The method of claim 1, wherein the adjusted target output is a highest or lowest output from the plurality of received outputs.

8. The method of claim 1, wherein the threshold is a fixed, predetermined value.

9. The method of claim 1, wherein adjusting the temperature of the dispersion management device comprises adjusting a temperature of an etalon of the dispersion management device.

10. The method of claim 1, wherein adjusting the temperature of the dispersion management device comprises adjusting a temperature of a ring resonator of the dispersion management device.

11. The method of claim 1, wherein adjusting the temperature of the dispersion management device is performed via a thermal control component of the dispersion management device.

12. The method of claim 1, further comprising:

based on determining that the difference between the obtained output and the initial target output is below a threshold, monitoring the temperature of the dispersion management device of the optical transceiver.

13. The method of claim 1, wherein the temperature range is a first temperature range, the method further comprising:

tuning the temperature of the dispersion management device across a second temperature range, wherein the second temperature range is greater than a temperature cycle corresponding to a full free spectral range of the dispersion management device.

14. The method of claim 13, wherein the initial target temperature is identified based on the temperature tuning across the second temperature range.

15. The method of claim 14, wherein the plurality of outputs received from the digital signal processor during temperature tuning across the first temperature range is a first plurality of outputs, the method further comprising:

receiving a second plurality of outputs from the digital signal processor during the temperature tuning across the second temperature range.

16. The method of claim 15, wherein the initial target output is selected from the second plurality of received outputs.

17. A computer system associated with an optical transceiver, the computer system comprising one or more processors and one or more computer-readable non-transitory storage media coupled to one or more of the processors and comprising instructions operable when executed by one or more of the processors to cause the computer system to perform operations comprising:

receiving an output from a digital signal processor of the optical transceiver;

determining a difference between the received output and an initial target output;

based on determining that the difference between the received output and the initial target output exceeds a threshold, tuning a temperature of a dispersion management device of the optical transceiver across a temperature range;

receiving a plurality of outputs from the digital signal processor during the temperature tuning across the temperature range;

selecting an adjusted target output from the plurality of received outputs based on the temperature tuning across the temperature range; and sending instructions to adjust the temperature of the dispersion management device to an adjusted target temperature corresponding to the adjusted target output.

18. One or more computer-readable non-transitory storage media embodying software that is operable when executed, by a computer system associated with an optical transceiver, to perform operations comprising:

receiving an output from a digital signal processor of the optical transceiver;

determining a difference between the received output and an initial target output;

based on determining that the difference between the received output and the initial target output exceeds a threshold, tuning a temperature of a dispersion management device of the optical transceiver across a temperature range;

receiving a plurality of outputs from the digital signal processor during the temperature tuning across the temperature range;

selecting an adjusted target output from the plurality of received outputs based on the temperature tuning across the temperature range; and sending instructions to adjust the temperature of the dispersion management device to an adjusted target temperature corresponding to the adjusted target output.

* * * * *